United States Patent
Xin et al.

(10) Patent No.: US 11,418,299 B2
(45) Date of Patent: Aug. 16, 2022

(54) TRANSMISSIONS USING SPREADING CODES

(71) Applicant: ZTE Corporation, Guangdong (CN)

(72) Inventors: Yu Xin, Guangdong (CN); Luanjian Bian, Guangdong (CN)

(73) Assignee: ZTE Corporation, Shenzhen (CN)

( * ) Notice: Subject to any disclaimer, the term of this patent is extended or adjusted under 35 U.S.C. 154(b) by 189 days.

(21) Appl. No.: 17/005,006

(22) Filed: Aug. 27, 2020

(65) Prior Publication Data
US 2020/0396032 A1    Dec. 17, 2020

Related U.S. Application Data

(63) Continuation of application No. PCT/CN2018/078024, filed on Mar. 5, 2018.

(51) Int. Cl.
*H04L 5/00*    (2006.01)
*H04W 72/04*    (2009.01)

(52) U.S. Cl.
CPC .......... *H04L 5/0021* (2013.01); *H04L 5/0094* (2013.01); *H04W 72/0453* (2013.01)

(58) Field of Classification Search
CPC ................ H04L 5/0021; H04L 5/0094; H04L 27/26265; H04L 27/2602; H04L 5/023; H04L 27/36; H04L 27/20; H04W 72/0453; H04B 1/707; H04J 11/0023
See application file for complete search history.

(56) References Cited

U.S. PATENT DOCUMENTS

| | | | |
|---|---|---|---|
| 7,203,245 B1 | 4/2007 | Murphy | |
| 2003/0185281 A1* | 10/2003 | Roh | H04J 13/22 375/140 |

FOREIGN PATENT DOCUMENTS

| | | |
|---|---|---|
| CN | 101114843 A | 1/2008 |
| CN | 101313502 A | 11/2008 |
| CN | 101371604 A | 2/2009 |
| CN | 101510799 A | 8/2009 |
| CN | 105634702 A | 6/2016 |

OTHER PUBLICATIONS

International Search Report and Written Opinion dated Nov. 23, 2018 for International Application No. PCT/CN2018/078024, filed on Mar. 5, 2018 (6 pages).
Office Action for Chinese Patent Application No. 201880090811.1, dated May 7, 2021 (16 pages).

* cited by examiner

*Primary Examiner* — Thai Nguyen
(74) *Attorney, Agent, or Firm* — Perkins Coie LLP

(57) ABSTRACT

Methods, systems, and devices related to reducing out-of-band emissions for Orthogonal Frequency-Division Multiplexing (OFDM) technology are described. In one representative aspect, a method for wireless communication includes obtaining N groups of spread data by multiplying N groups of data with N spreading codes, combining the N groups of spread data into a data sequence, modulating the data sequence onto 2K subcarriers, and transmitting the modulated data sequence. In particular, an individual spreading code of the N spreading codes comprises 2K elements organized as a sequence of K pairs, wherein the pairs comply with at least one of (1) two elements in a pair have a 180-degree phase difference or (2) corresponding elements in neighboring pairs have a 180-degree phase difference. N and K are integers greater than 1 and N is less than 2K.

20 Claims, 7 Drawing Sheets

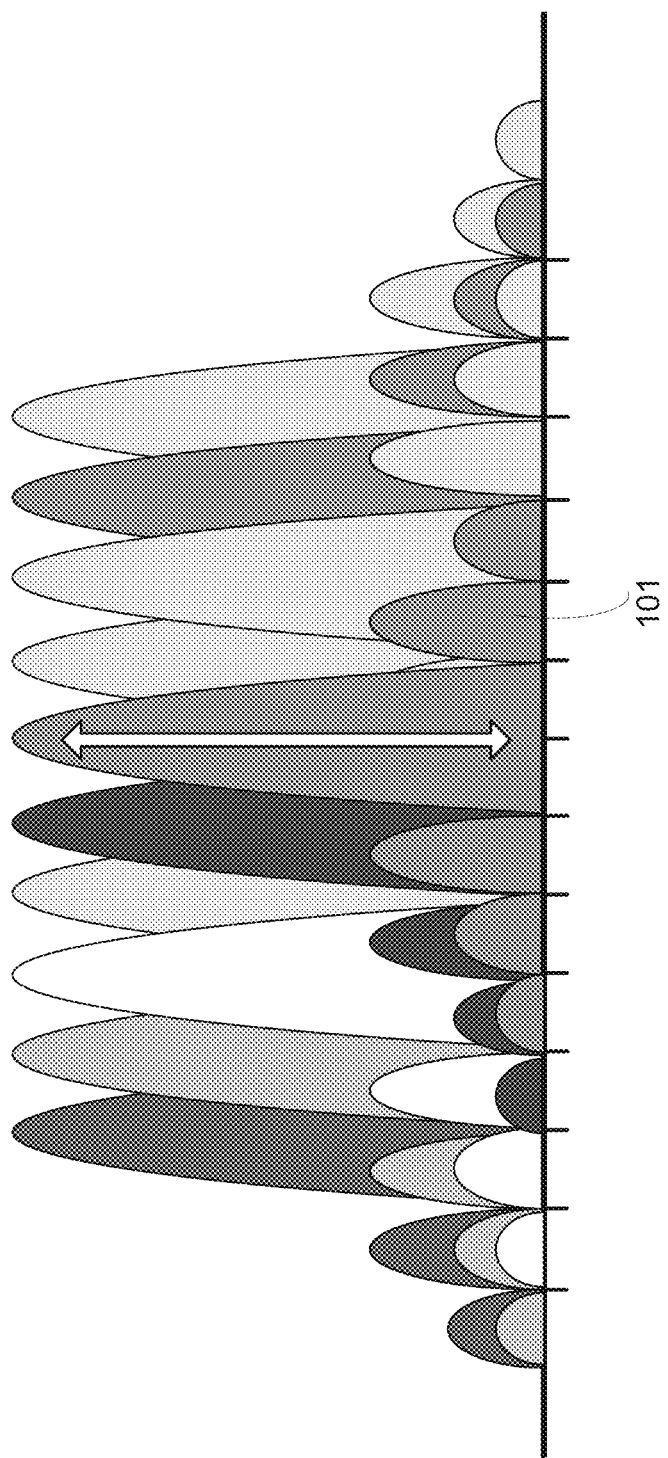

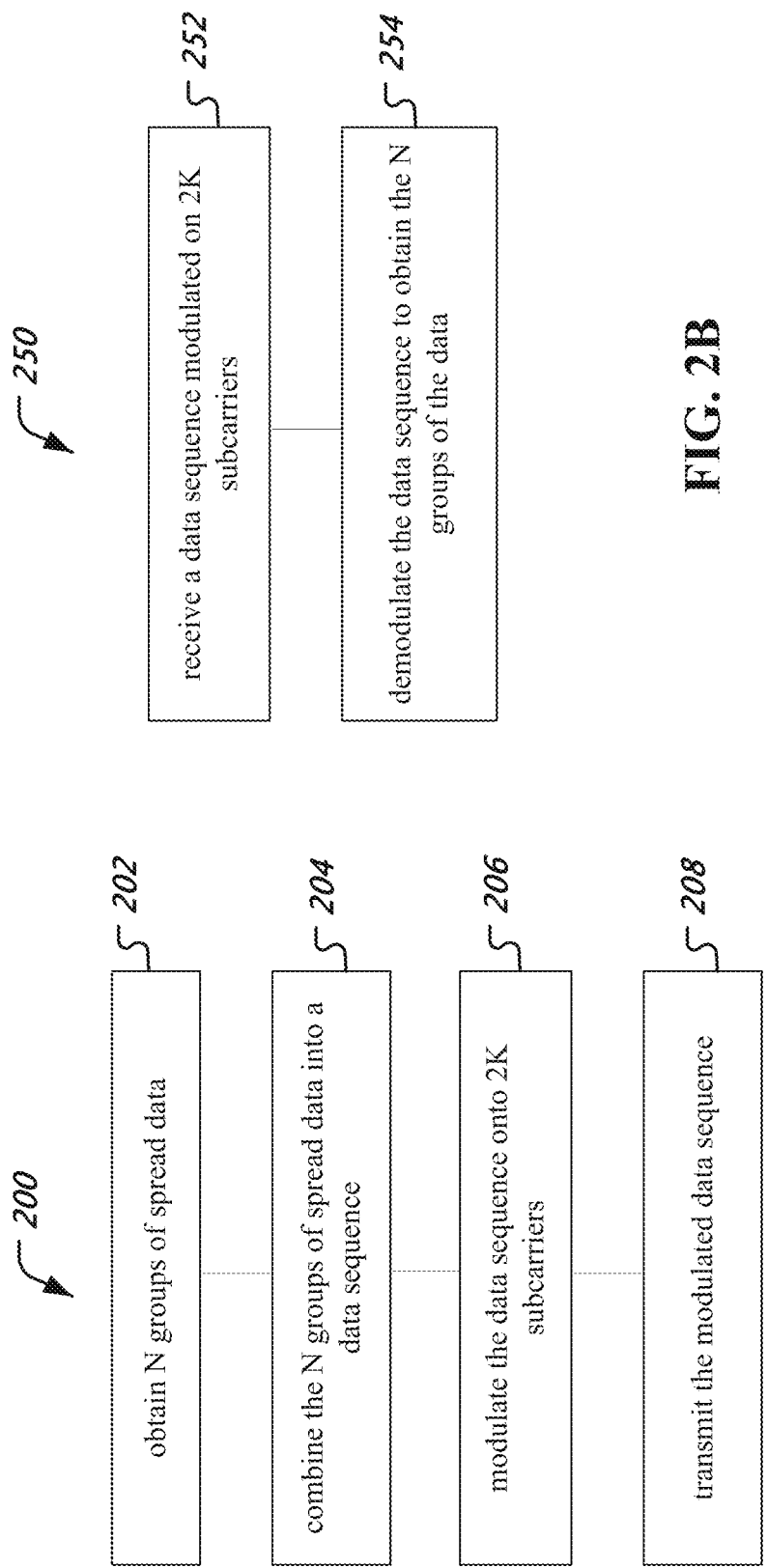

TRANSMISSIONS USING SPREADING CODES

CROSS REFERENCE TO RELATED APPLICATIONS

This patent document is a continuation of and claims benefit of priority to International Patent Application No. PCT/CN2018/078024, filed on Mar. 5, 2018. The entire content of the before-mentioned patent application is incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to reducing out-of-band emissions for Orthogonal Frequency-Division Multiplexing (OFDM) technology.

In one representative aspect, a method for wireless communication is disclosed. The method includes obtaining N groups of spread data by multiplying N groups of data with N spreading codes; combining the N groups of spread data into a data sequence; modulating the data sequence onto 2K subcarriers; and transmitting the modulated data sequence. An individual spreading code of the N spreading codes comprises 2K elements organized as a sequence of K pairs, wherein the pairs comply with at least one of (1) two elements in a pair have a 180-degree phase difference or (2) corresponding elements in neighboring pairs have a 180-degree phase difference. N and K are integers greater than 1 and N is less than 2K.

In another representative aspect, a method for wireless communication is disclosed. The method includes receiving a data sequence modulated on 2K subcarriers, wherein the data sequence is generated by combining N groups spread data, the N groups of spread data obtained by multiplying N groups of data with N spreading codes; and demodulating the data sequence based on the N spreading codes to obtain the N groups of the data. An individual spreading code of the N spreading codes comprises 2K elements organized as a sequence of K pairs, wherein the pairs comply with at least one of (1) two elements in a pair have a 180-degree phase difference or (2) corresponding elements in neighboring pairs have a 180-degree phase difference. N and K are integers greater than 1 and N is less than 2K.

In another representative aspect, a wireless communications apparatus comprising a processor is disclosed. The processor is configured to implement a method described herein.

In yet another representative aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

BRIEF DESCRIPTION OF THE DRAWINGS

FIG. 1A shows a schematic diagram of side lobes producing overlapping spectra between subcarriers in the frequency domain.

FIG. 2A is a flowchart representation of a method for wireless communication.

FIG. 2B is a flowchart representation of another method for wireless communication.

DETAILED DESCRIPTION

Orthogonal Frequency-Division Multiplexing (OFDM) is a method of encoding digital data on multiple carrier frequencies. OFDM has developed into a popular scheme for wideband digital communication and is used in many communication systems such as fourth-generation (4G) and fifth generation (5G) wireless communications networks. OFDM technology uses the characteristics that the subcarriers are orthogonal to each other and do not interfere with each other, and allows for multiple simultaneous data transmissions on multiple subcarriers.

One possible drawbacks with traditional OFDM is its relative high levels of out-of-band (OOB) emission due to the sidelobes of the subcarriers. The OOB emission may result in strong interference into neighboring frequency bands. FIG. 1A shows a schematic diagram of side lobes 101 producing overlapping spectra between subcarriers in the frequency domain. To reduce the impact of OOB emission, the edge of the transmission band can dedicate a certain frequency as a guard interval to reduce the influence of out-of-band leakage on adjacent bands. The guard interval, however, introduces waste in the frequency bands and reduces spectrum efficiency. This becomes an important concern for communication systems, especially when many different radio-systems co-reside cooperatively in densely packed spectrum bands.

Figure 1B:
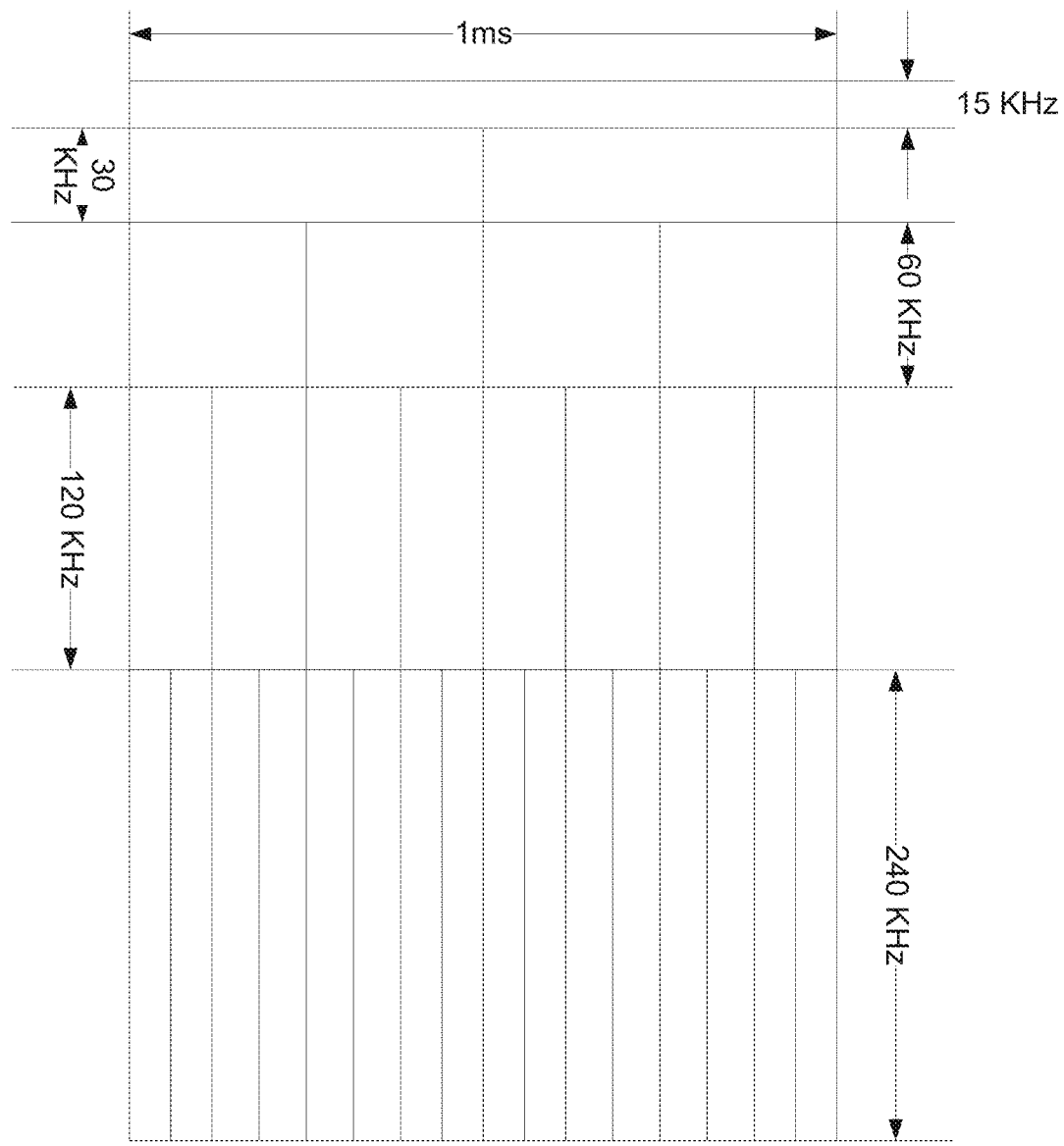
FIG. 1B is a schematic diagram of different subcarrier spacings and corresponding slot sizes.

Furthermore, with the advance of wireless communication technologies, subcarrier spacing is no longer strictly uniform. For example, New Radio (NR) technology being developed as a 5G technology solution supports different subcarrier spacing values. Table 1 shows five numerologies that are supported by the NR, each corresponding to a different subcarrier spacing. FIG. 1B is a schematic diagram of different subcarrier spacings and their corresponding slot sizes. Because adjacent subcarriers can have different numerologies, the OOB emission can result in stronger interference into neighboring frequency bands (e.g., between a 15 KHz subcarrier and a 240 KHz subcarrier).

TABLE 1

Different Numerologies in NR

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Currently available technologies fail to effectively reduce OOB emissions for achieving better spectrum efficiency. The present disclosure describes data modulation techniques that can be used in various embodiments to reduce out-of-band emission. The disclosed techniques can be used to build embodiments that significantly improve spectrum utilization efficiency for transmissions based on the OFDM technology.

Overview

A set of spreading codes that allows canceling of the sidelobe amplitude can be used to help reduce OOB emission. For example, a group of data can be spread by multiplying the data with a spreading code having a length L (L>1). The spread data then can be transmitted on L subcarriers. Doing so, however, reduces data transmission efficiency, because the same data is transmitted on multiple subcarriers.

To address the problem of data transmission efficiency, multiple groups of data can be combined and transmitted together. FIG. 2A is a flowchart representation of a method 200 for wireless communication. The method 200 includes, at 202, obtaining N groups of spread data by multiplying N groups of data with N spreading codes. The method 200 includes, at 204, combining the N groups of spread data into a data sequence. The method includes, at 206, modulating the data sequence onto 2K subcarriers. The method 200 also includes, at 208, transmitting the modulated data sequence. Here, an individual spreading code of the N spreading codes includes 2K elements organized as a sequence of K pairs. The pairs comply with at least one of (1) two elements in a pair have a 180-degree phase difference or (2) corresponding elements in neighboring pairs have a 180-degree phase difference. Both N and K are integers greater than 1, and N<2K.

In some embodiments, the method further includes selecting the N spreading codes from 2K spreading codes. In some implementations, the 2K spreading codes are orthogonal to each other. In some implementations, the N spreading codes may be selected from at least 2K spreading codes (e.g., 2K+P spreading codes), with a subset of the spreading codes being non-orthogonal to each other.

In some embodiments, the combining of the N groups of spread data includes adding the multiple groups of spread data to generate the data sequence.

In some embodiments, the combining of the multiple groups of spread data includes applying a coefficient to each of the N groups of spread data to generate multiple groups of weighted spread data, and adding the multiple groups of weighted spread data to generate the data sequence. In some implementations, coefficients for the multiple groups of spread data are ordered based on corresponding absolute values of the coefficients.

In some embodiments, centers of the 2K subcarriers are separated by an equal distance in frequency domain. For example, the equal distance in frequency domain can be equivalent to a frequency-domain spacing between centers of neighboring subcarriers.

In some embodiments, the N spreading codes comprise one spreading code that complies with: two elements in every pair have a 180-degree phase difference.

FIG. 2B is a flowchart representation of a method 200 for wireless communication. The method 250 includes, at 252, receiving a data sequence modulated on 2K subcarriers, wherein the data sequence is generated by combining N groups spread data, the N groups of spread data obtained by multiplying N groups of data with N spreading codes. The method also includes, at 254, demodulating the data sequence based on the N spreading codes to obtain the N groups of the data.

Details of the disclosed techniques are described in the following embodiments. In the following embodiments, a transmission of a data sequence is performed on a transmission frequency band. The transmission frequency band refers to a frequency resource for transmitting data. The transmission frequency band can include multiple subcarriers. The transmission frequency band may be a wideband, a sub-band within a wideband, or a frequency resource that includes multiple transmission bandwidths and/or sub-bands. A wideband channel may, for example, include 128, 512, 1024 or higher number of subcarriers and may span a bandwidth of several MHz (e.g., 1, 5, 10, 20 or greater than 20 MHz). It is also noted that the embodiments below mainly focus on spreading codes that include four elements (K=2). However, the disclosed techniques are not limited to K=2 and can be applied to spreading codes having various numbers of elements.

Example Embodiment 1

This embodiment describes the selection of the N spreading codes.

A spreading code can have elements that are either C or −C, where C is a complex value. To obtain a spreading code that has 2K elements, a pool of 2K spreading codes can be generated such that the 2K spreading codes are mutually orthogonal.

An individual spreading code is organized as a sequence of K pairs. In some embodiments, N spreading codes are selected such that the selected codes satisfy at least one of the following: (1) two elements in a pair have a 180-degree phase difference, or (2) corresponding elements in neighboring pairs have a 180-degree phase difference.

In some implementations, simulations can be performed to determine if some of the spreading codes (e.g., 2K-M codes) in the pool fail to effectively suppress OOB emissions. The remaining M spreading codes then can effectively suppress OOB emissions and the N spreading codes selected from the M spreading codes can be used to obtain spread data for transmissions over multiple subcarriers. M are integers greater than 1, and N<=M<2K. For example, value of N can be 1, 2, 3, . . . , M.

For example, when K=2, a pool of four spreading codes can be determined: S1=[C, −C, −C, C], S2=[C, −C, C, −C], S3=[C, C, −C, −C], and S4=[C, C, C, C]. S1, S2, S3 are selected because for each one of them, two elements in a pair have a phase difference of π or corresponding elements in neighboring pairs have a phase difference of π. S4 is not selected because it does not satisfy either of the conditions, and thus cannot be used to effectively suppress OOB emissions.

In some embodiments, the elements in a spreading code may have different absolute values (i.e., modulus). The modulus of each element in the spreading code affects the amplitude of the resulting signal, thereby impacting side lobe amplitudes and OOB emission. Choosing different modulus for each element can enhance or impact the effectiveness of suppressing OOB emission for that spreading code. For example, a spreading code may include the following elements [$C_1$, $-C_2$, $C_3$, $-C_4$]. The moduli of at least two of $C_1$, $C_2$, $C_3$, $C_4$ are different.

Figure 3A:
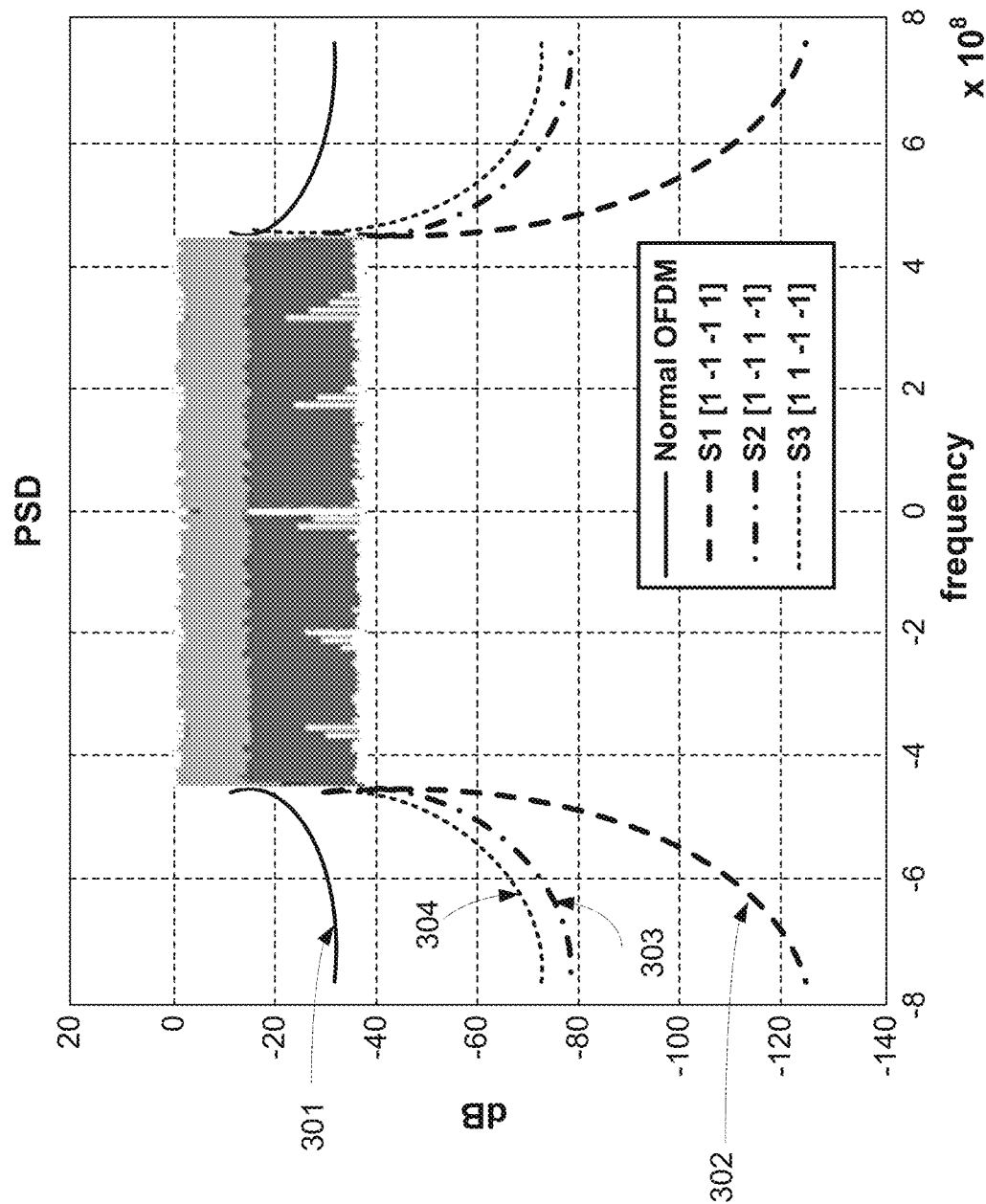
FIG. 3A shows a comparison of the conventional OFDM technology with modified OFDM techniques using different spreading codes.

Simulations can be performed to evaluate the effectiveness of each spreading code. FIG. 3A shows a comparison of the conventional OFDM technology with modified OFDM techniques using different spreading codes. The top curve 301 shows the power spectral density of conventional OFDM. The bottom curve 302 shows the power spectral density of OFDM modulation using spreading code S1. The curves 303, 304 in the middle show the power spectral density of OFDM modulation using spreading code S2 and S3 respectively. It is thus evident that the S1 is the most effective spreading code for suppressing the OOB emission, followed by S2. Among the three codes (S1, S2, and S3), S3 is the least effective.

Because effectiveness of suppressing OOB emission of different spreading codes is different (e.g., S1>S2>S3), the more effective spreading codes can be more desirable for various scenarios. The most effective spreading codes can be used for different scenarios, while the less effective spreading codes can be used for a limited number of scenarios. For example, when transmitting N=1 group of data, S1 is selected to spread the data. When transmitting N=2 groups of data, S1 and S2 are selected to spread the data. When transmitting N=3 groups of data, S1, S2, and S3 are all selected to spread the data.

Example Embodiment 2

This embodiment describes the combination of multiple groups of spread data.

In some implementations, multiple groups of spread data can be combined by adding the groups together. In some embodiments, a set of coefficients can be used to obtain a weighted sum of the multiple groups of data. A weighted sum can be beneficial because different spreading codes have different effectiveness for suppressing OOB emission.

For example, as shown above, S1 is more effective than S2 and S3 (i.e., S1>S2>S3). Each spreading code has a corresponding coefficient P(1), P(2), and P(3). The absolute values (i.e., moduli) of the coefficients can correspond to the effectiveness of the spreading codes. For example, in some embodiments, $|P(1)|>|P(2)|\geq|P(3)|$. In some implementations, the coefficients can have the same modulus value. It is noted that the moduli of the coefficients can impact data demodulation performance. Thus, it is desirable to consider the performance of the transmission band when configuring the coefficients.

Example Embodiment 3

This embodiment describes the subcarriers that the spread data is transmitted on.

After groups of data are spread and combined, the combined data is modulated and transmitted on 2K subcarriers.

In some embodiments, the 2K subcarriers are consecutive in the frequency domain. In some embodiments, the 2K subcarriers can be separated.

For example, the 2K subcarriers can be separated with an equal spacing between each other. In some implementations, two adjacent subcarriers are separated by m intervals in the frequency domain (m≥0). The value of m can be configured according to various factors such as channel conditions or transmission scenarios.

Example Embodiment 4

Figure 3B:
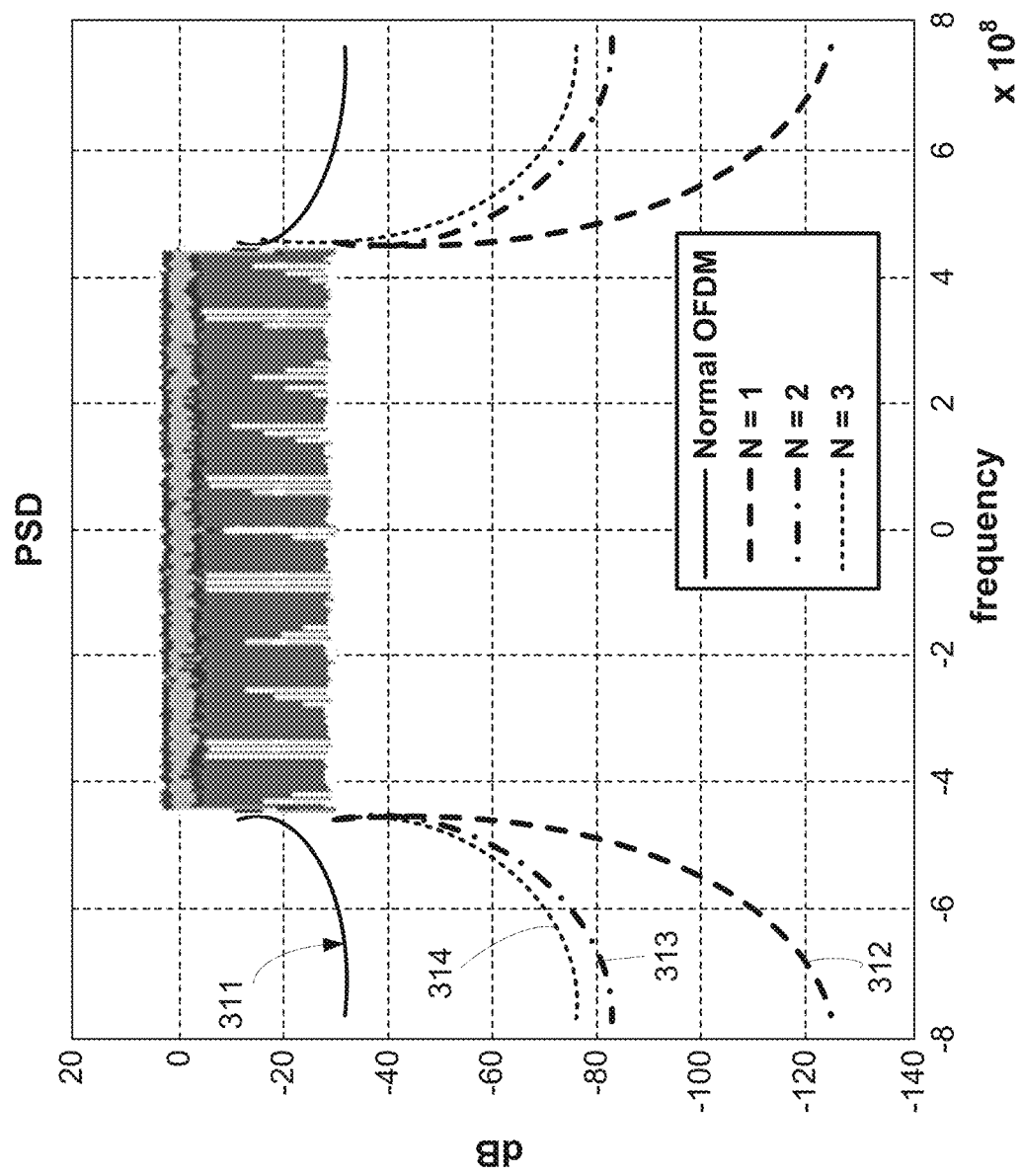
FIG. 3B shows another comparison of the conventional OFDM technology with modified OFDM techniques using different spreading codes.

FIG. 3B shows another comparison of the conventional OFDM technology with modified OFDM techniques using different spreading codes. The plots shown in FIG. 3B are generated based on the following scenarios. In particular, the top curve 311 shows the power spectral density of conventional OFDM.

When N=1, spread data is obtained by multiplying one group of data with S1=[C, −C, −C, C]. The size of the spread data is four times the size of the original data. The spread data is then transmitted on four subcarriers. The OOB emission can be greatly reduced (as shown by the bottom curve 312), but the data transmission efficiency is only 25%.

When N=2, spread data is obtained by multiplying two groups of data with spreading codes. The first group is multiplied with S1=[C, −C, −C, C]. The second group is multiple with S2=[C, −C, C, −C]. The two groups of spread data are combined by obtaining a weighted sum of the two groups using coefficients $P(1)=P(2)=\sqrt{1/2}$. The combined spread data is then transmitted on four subcarriers. The OOB emission can be reduced (as shown by curve 313), and the data transmission efficiency is 50%.

When N=3, spread data is obtained by multiplying three groups of data with spreading codes. The first group is multiplied with S1=[C, −C, −C, C]. The second group is multiplied with S2=[C, −C, C, −C]. The third group is multiplied with S3=[C, C, −C, −C]. The three groups of spread data are combined by obtaining a weighted sum of the three groups using coefficients $P(1)=P(2)=P(3)=\sqrt{1/3}$. The combined spread data is then transmitted on four subcarriers. The OOB emission can be reduced (as shown by curve 314), and the data transmission efficiency is 75%.

Example Embodiment 5

This embodiment describes a detailed implementation of the techniques disclosed herein.

In this example, K=2 and N=3. Three spreading codes are selected from 2K=4 spreading codes: S1=[1, −1, −1, 1], S2=[1, −1, 1, −1], and S3=[1, 1, −1, −1].

Part or all of data to be transmitted in a OFDM symbol of a transmission band is divided into three groups. The first group includes [$a_1$, $a_2$, $a_3$, . . . , $a_m$]. The second group includes [$b_1$, $b_2$, $b_3$, . . . , $b_m$]. The third group includes [$c_1$, $c_2$, $c_3$, . . . , $c_m$].

The first group of data to be transmitted is multiplied with S1=[1, −1, −1, 1] to obtain [$a_1$, $-a_1$, $-a_1$, $a_1$, $a_2$, $-a_2$, $-a_2$, $a_2$, $a_3$, $-a_3$, $-a_3$, $a_3$, . . . , $a_m$, $-a_m$, $-a_m$, $a_m$]. The second group of data to be transmitted is multiplied with S2=[1, −1, 1, −1] to obtain [$b_1$, $-b_1$, $b_1$, $-b_1$, $b_2$, $-b_2$, $b_2$, $-b_2$, $b_3$, $-b_3$, $b_3$, $-b_3$, . . . , $b_m$, $-b_m$, $b_m$, $-b_m$]. The third group of data to be transmitted is multiplied with S3=[1, 1, −1, −1] to obtain [$c_1$, $c_1$, $-c_1$, $-c_1$, $c_2$, $c_2$, $-c_2$, $-c_2$, $c_3$, $c_3$, $-c_3$, $-c_3$, . . . , $c_m$, $c_m$, $-c_m$, $-c_m$].

The three groups of spread data are combined by performing a weighted sum of the groups using coefficients P(1), P(2), and P(3): $D=P(1)\times[a_1, -a_1, -a_1, a_1, a_2, -a_2, -a_2, a_2, a_3, -a_3, -a_3, a_3, \ldots, a_m, -a_m, -a_m, a_m] + P(2)\times[b_1, -b_1, -b_1, b_1, b_2, -b_2, b_2, b_3, -b_3, b_3, -b_3, \ldots, b_m, -b_m, b_m, -b_m] + P(3)\times[c_1, c_1, -c_1, -c_1, c_2, c_2, -c_2, -c_2, C_3, C_3, -C_3, -c_3, \ldots, c_m, c_m, -c_m, -c_m]$. The values of P(1), P(2), and P(3) can be equal or different according to the channel conditions. The combined data D is then transmitted on 2K×m=4m subcarriers.

Figure 4:
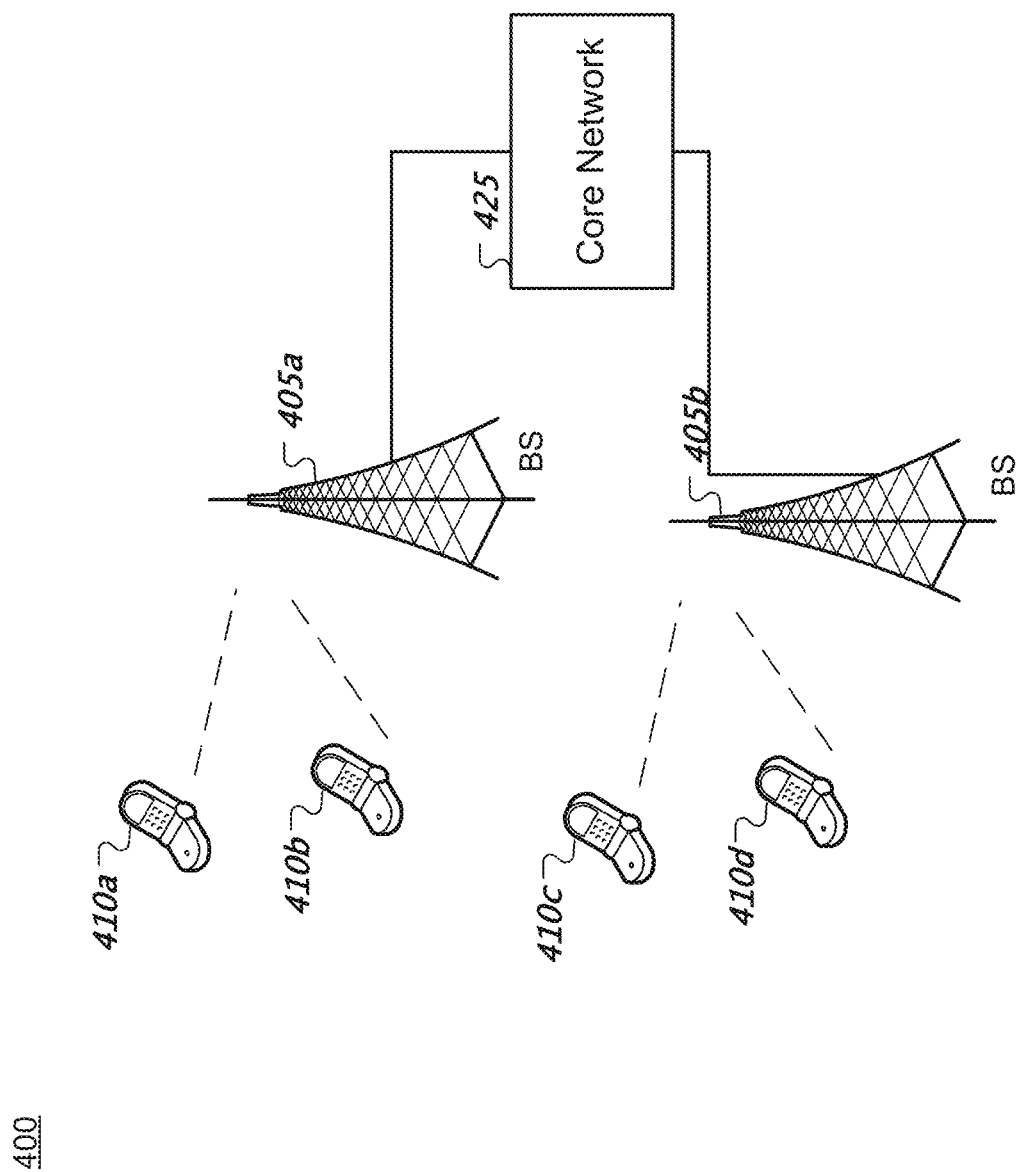
FIG. 4 shows an example of a wireless communication system where techniques in accordance with one or more embodiments of the present technology can be applied.

FIG. 4 shows an example of a wireless communication system where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
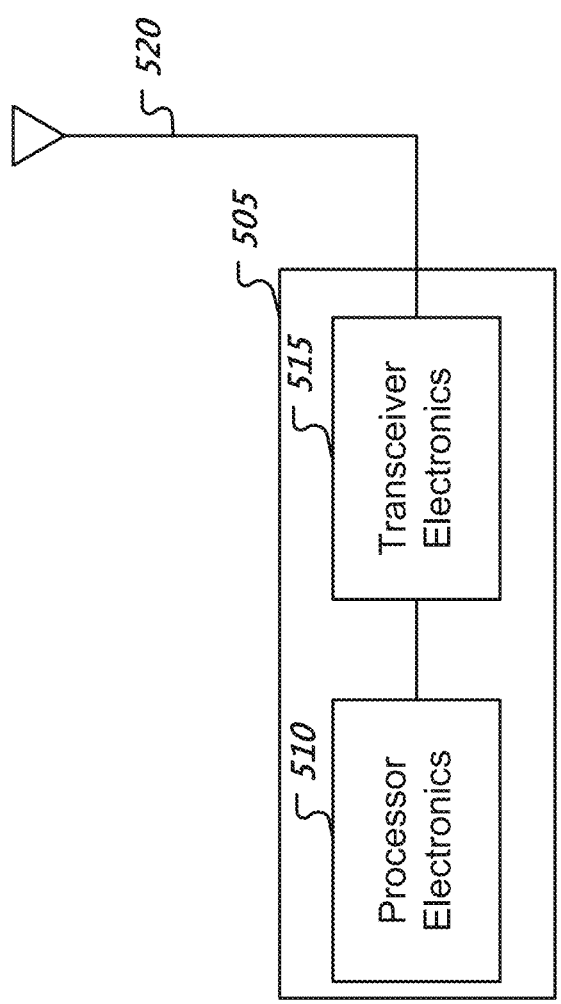
FIG. 5 is a block diagram representation of a portion of a radio station.

FIG. 5 is a block diagram representation of a portion of a radio station. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

It is thus evident that methods and corresponding apparatus relating the reduction of out-of-band emission are disclosed. Using the disclosed techniques, out-of-band emission can be significantly suppressed without sacrificing much of the transmission efficiency. The spectrum utilization can thus be improved for transmission based on the OFDM technology.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication,
   obtaining N groups of spread data by multiplying N groups of data with N spreading codes;
   combining the N groups of spread data into a data sequence;
   modulating the data sequence onto 2×K subcarriers; and
   transmitting the modulated data sequence,
   wherein an individual spreading code of the N spreading codes comprises 2×K elements organized as a sequence of K pairs, wherein the pairs comply with at least one of (1) two elements in a pair have a 180-degree phase difference or (2) corresponding elements in neighboring pairs have a 180-degree phase difference, and
   wherein N and K are integers greater than 1 and N<2×K.

2. The method of claim 1, further comprising:
   selecting the N spreading codes from 2×K spreading codes that are orthogonal to each other, wherein the N spreading codes comprise one spreading code that complies with: two elements in every pair have a 180-degree phase difference.

3. The method of claim 1, wherein the combining of the multiple groups of spread data comprises:
   applying a coefficient to each of the N groups of spread data to generate multiple groups of weighted spread data; and
   adding the multiple groups of weighted spread data to generate the data sequence,
   wherein coefficients for the multiple groups of spread data are ordered based on corresponding absolute values of the coefficients.

4. The method of claim 1, wherein centers of the 2×K subcarriers are separated by an equal distance in frequency domain, wherein the equal distance in frequency domain is equivalent to a frequency-domain spacing of m subcarriers, m 1.

5. The method of claim 1, wherein the spreading codes comprise at least one of: S1=[C, −C, −C, C], S2=[C, −C, C, −C], or S3=[C, C, −C, −C], C being a complex number.

6. A method of wireless communication, comprising:
   receiving a data sequence modulated on 2×K subcarriers, wherein the data sequence is generated by combining N groups spread data, the N groups of spread data obtained by multiplying N groups of data with N spreading codes; and
   demodulating the data sequence based on the N spreading codes to obtain the N groups of the data,
   wherein an individual spreading code of the N spreading codes comprises 2×K elements organized as a sequence of K pairs, wherein the pairs comply with at least one of (1) two elements in a pair have a 180-degree phase difference or (2) corresponding elements in neighboring pairs have a 180-degree phase difference, and
   wherein N and K are integers greater than 1 and N<2×K.

7. The method of claim 6, wherein the N spreading codes are selected from 2×K spreading codes that are orthogonal to each other, and wherein the N spreading codes comprise one spreading code that complies with: two elements in every pair have a 180-degree phase difference.

8. The method of claim 6, the data sequence is generated based on:
   applying a coefficient to each of the N groups of spread data to generate multiple groups of weighted spread data; and
   adding the multiple groups of weighted spread data together,
   wherein coefficients for the multiple groups of spread data are ordered based on corresponding absolute values of the coefficients.

9. The method of claim 6, wherein centers of the 2×K subcarriers are separated by an equal distance in frequency domain, wherein the equal distance in frequency domain is equivalent to a frequency-domain spacing of m subcarriers, m≥1.

10. The method of claim 6, wherein the spreading codes comprise at least one of: S1=[C, −C, −C, C], S2=[C, −C, C, −C], or S3=[C, C, −C, −C], C being a complex number.

11. An apparatus for wireless communication, comprising:
    a processor; and
    a memory including processor executable code, wherein the processor executable code upon execution by the processor configures the processor to:
    obtain N groups of spread data by multiplying N groups of data with N spreading codes;
    combine the N groups of spread data into a data sequence;
    modulate the data sequence onto 2×K subcarriers; and
    transmit the modulated data sequence,
    wherein an individual spreading code of the N spreading codes comprises 2×K elements organized as a sequence of K pairs, wherein the pairs comply with at least one of (1) two elements in a pair have a 180-degree phase difference or (2) corresponding elements in neighboring pairs have a 180-degree phase difference, and wherein N and K are integers greater than 1 and N<2×K.

12. The apparatus of claim 11, wherein the processor is configured to:
select the N spreading codes from 2×K spreading codes that are orthogonal to each other, wherein the N spreading codes comprise one spreading code that complies with: two elements in every pair have a 180-degree phase difference.

13. The apparatus of claim 11, wherein the processor is configured to combine of the multiple groups of spread data based on:
applying a coefficient to each of the N groups of spread data to generate multiple groups of weighted spread data; and
adding the multiple groups of weighted spread data to generate the data sequence,
wherein coefficients for the multiple groups of spread data are ordered based on corresponding absolute values of the coefficients.

14. The apparatus of claim 11, wherein centers of the 2×K subcarriers are separated by an equal distance in frequency domain, wherein the equal distance in frequency domain is equivalent to a frequency-domain spacing of m subcarriers, m≥1.

15. The apparatus of claim 11, wherein the spreading codes comprise at least one of: S1=[C, −C, −C, C], S2=[C, −C, C, −C], or S3=[C, C, −C, −C], C being a complex number.

16. An apparatus for wireless communication, comprising:
a processor; and
a memory including processor executable code, wherein the processor executable code upon execution by the processor configures the processor to:
receive a data sequence modulated on 2×K subcarriers, wherein the data sequence is generated by combining N groups spread data, the N groups of spread data obtained by multiplying N groups of data with N spreading codes; and
demodulate the data sequence based on the N spreading codes to obtain the N groups of the data,
wherein an individual spreading code of the N spreading codes comprises 2×K elements organized as a sequence of K pairs, wherein the pairs comply with at least one of (1) two elements in a pair have a 180-degree phase difference or (2) corresponding elements in neighboring pairs have a 180-degree phase difference, and
wherein N and K are integers greater than 1 and N<2×K.

17. The apparatus of claim 16, wherein the N spreading codes are selected from 2×K spreading codes that are orthogonal to each other, and wherein the N spreading codes comprise one spreading code that complies with: two elements in every pair have a 180-degree phase difference.

18. The apparatus of claim 16, the data sequence is generated based on:
applying a coefficient to each of the N groups of spread data to generate multiple groups of weighted spread data; and
adding the multiple groups of weighted spread data together,
wherein coefficients for the multiple groups of spread data are ordered based on corresponding absolute values of the coefficients.

19. The apparatus of claim 16, wherein centers of the 2×K subcarriers are separated by an equal distance in frequency domain, wherein the equal distance in frequency domain is equivalent to a frequency-domain spacing of m subcarriers, m≥1.

20. The apparatus of claim 16, wherein the spreading codes comprise at least one of: S1=[C, −C, −C, C], S2=[C, −C, C, −C], or S3=[C, C, −C, −C], C being a complex number.

* * * * *

UNITED STATES PATENT AND TRADEMARK OFFICE
CERTIFICATE OF CORRECTION

PATENT NO. : 11,418,299 B2
APPLICATION NO. : 17/005006
DATED : August 16, 2022
INVENTOR(S) : Yu Xin et al.

It is certified that error appears in the above-identified patent and that said Letters Patent is hereby corrected as shown below:

In the Specification

In Column 1, Line 53, delete "groups" and insert -- groups of --, therefor.

In Column 4, Line 16, delete "groups" and insert -- groups of --, therefor.

In Column 7, Line 60, delete "the" and insert -- to the --, therefor.

In Column 8, Line 4, delete "except as" and insert -- except --, therefor.

In Column 8, Line 20, delete "more them." and insert -- more of them. --, therefor.

In Column 9, Lines 9-10, delete "CD ROM" and insert -- CD-ROM --, therefor.

In the Claims

In Column 10, Line 10, in Claim 4, delete "m 1." and insert -- $m \geq 1$. --, therefor.

In Column 10, Line 18, in Claim 6, delete "groups" and insert -- groups of --, therefor.

In Column 11, Line 12, in Claim 13, delete "of the" and insert -- the --, therefor.

In Column 12, Line 1, in Claim 16, delete "groups" and insert -- groups of --, therefor.

Signed and Sealed this
Twenty-seventh Day of June, 2023

Katherine Kelly Vidal
*Director of the United States Patent and Trademark Office*